US007309154B2

(12) United States Patent
Ohkawa

(10) Patent No.: US 7,309,154 B2
(45) Date of Patent: Dec. 18, 2007

(54) LIGHT GUIDE PLATE, SURFACE LIGHT SOURCE DEVICE AND DISPLAY

(75) Inventor: Shingo Ohkawa, Misato (JP)

(73) Assignee: Enplas Corporation, Kawaguchi (JP)

( * ) Notice: Subject to any disclaimer, the term of this patent is extended or adjusted under 35 U.S.C. 154(b) by 143 days.

(21) Appl. No.: 11/363,214

(22) Filed: Feb. 28, 2006

(65) Prior Publication Data

US 2006/0239032 A1    Oct. 26, 2006

(30) Foreign Application Priority Data

Feb. 28, 2005   (JP)   ............................. 2005-052967

(51) Int. Cl.
*F21V 7/04* (2006.01)
(52) U.S. Cl. .................... 362/615; 362/608; 362/621
(58) Field of Classification Search ................ 362/621, 362/615, 616, 617, 619, 622, 625, 606, 608, 362/612, 558
See application file for complete search history.

(56) References Cited

U.S. PATENT DOCUMENTS 5,890,796 A * 4/1999 Marinelli et al. ........... 362/307

6,193,383 B1 * 2/2001 Onikiri et al. ................ 362/26
6,474,826 B1 * 11/2002 Tanaka et al. ............... 362/612
2006/0109684 A1 * 5/2006 Nesterenko et al. ........ 362/610
2006/0285356 A1 * 12/2006 Tseng ......................... 362/608

FOREIGN PATENT DOCUMENTS

JP         3496806        11/2003

* cited by examiner

*Primary Examiner*—Sandra O'Shea
*Assistant Examiner*—Gunyoung T. Lee
(74) *Attorney, Agent, or Firm*—Staas & Halsey LLP

(57) ABSTRACT

A surface light source device for illuminating a displaying member of a display comprises a light guide plate and primary light source. Primary light enters into a first guiding portion through an end face (incidence face) thereof extending in an extending direction, then inner-propagating and entering into any second guiding portion gradually meantime. A major part thereof is inner-reflected by an inner-reflection face (first side face) to be directed to a guiding-emitting-portion, then being outputted from an emission face gradually. The first side face makes a sharp angle α with respect to the extending direction at a portion connected to the guiding-emitting-portion. Second guiding portion has a second side face which is located on a side nearer to the incidence face and makes a sharp angle greater than α at a portion connected to the first guiding portion.

39 Claims, 15 Drawing Sheets

LIGHT GUIDE PLATE, SURFACE LIGHT SOURCE DEVICE AND DISPLAY

BACKGROUND

1. Field of Invention

The present invention relates to a light guide plate and surface light source device provided with the light guide plate, and to a display provided with the surface light source device. The present invention is applicable to backlighting of LCD panel used as displaying member for portable phone, game playing machine, electric note book, mobile terminal device or personal computer, or that of display panel for other usages such as advertising.

In addition, the present invention is applied to a light guide plate employed in the surface light source device and a display comprising the surface light source device and displaying member.

2. Related Art

It is known to backlight a displaying member such as LCD panel by an illumination light outputted from a surface light source device. In general, a surface light source device comprises a light guide plate provided with an incidence face and an emission face, and primary light is introduced through the incidence face, an illumination light is outputted toward a displaying member.

Light emitting diode (LED) have been growingly often employed as a primary light source in recent years instead of fluorescent lamp. Document 1 noted below discloses an example of such. LED is small in weight and size (point-like light source), being suitable for making surface light source devices or displays using surface light source devices small in weight and size.

Under such background, a surface light source device (improved art) employing light guide plate 100 as shown in FIG. 18 has been proposed. Referring to FIG. 18, light guide plate 100 first guiding portion 102 and a plurality of second guiding portions 103 bridging first guiding portion 102 to plate-like member (guiding-and-emitting-portion) 101.

Light from LED 107 disposed opposite to end face 106 of first guiding portion 102 travels within first guiding portion 102 in a direction (length-direction; perpendicular to end face 106) along side face 104 of plate-like member 101. It is noted that side face 104 gives a plane (interface) on which a boundary between second guiding portion 103 and plate-like member (guiding-and-emitting-portion) 101 exists.

Second guiding portion 103 causes this light to enter into the inside of plate-like member (light guide plate) 101 from side face 104 thereof, producing an inner propagation light travelling within plate-like member 101. This inner propagation light is emitted gradually from emission face 105 on the way of travelling.

Attention should be paid to a fact such that LED 107 supplies primary light through end face 106 of first guiding portion 102. This means that a primary light source (LED 107) is not required to be disposed opposite to side face 104 of plate-like member 101. Since many second guiding portions 103 optically bridge first guiding portion 102 to plate-like member 101, if LED 107 disposed in the vicinity of end face 106 of first guiding portion 102, light propagating within first guiding portion 102 overall is then transferred to plate-like member 101 via second guiding portion 103 In other words, first guiding portion 102 functions like a kind of "imaginary primary light source".

As a result, a state like such that a plurality of imaginary primary light sources are disposed along side face 104 depending on number of second guiding portions 103 is realized. This enables emission face 5 to have a uniformalized emission brightness. Such uniformalization, in particular, avoiding the vicinity of side face 104 from showing an uneven brightness is hardly achieved by the prior art disclosed in Document 1, unless primary light sources are actually disposed along side face 104 at a small interval.

Document 1: Japanese Patent Publication Nos.3496806

Thus the improved art shown in FIG. 18 relaxes a shortage (uneven brightness around side face 104) of the prior art disclosed in the above Document 1.

However, there arises demands for still higher brightness and evenness of illumination light according to growingly improved performance of LCD panel and others.

OBJECT AND SUMMARY OF INVENTION

An object of the present invention is to provide a surface light source device which satisfies demands for still higher brightness and evenness of illumination light. Another object of the present invention is to provide a light guide plate employed in the surface light source device. Still another object of the present invention is to provide a display employing the surface light source device.

First, the present invention is applied to a light guide plate comprising a slender first guiding portion which has an end face providing an incidence face and extends along an extending direction vertical to said end face, a guiding-and-emitting-portion having a generally rectangular major face providing an emission face, a plurality of second guiding portions which bridge said first guiding portion to said guiding-and-emitting-portion at a plurality of positions along said extending direction.

According to a feature of the present invention, each of said second guiding portion has a first side face providing an inner-reflection face and a second side face nearer to said end face as compared with the first side face said first side face is connected to said first guiding portion at a first connection portion and is connected to said guiding-and-emitting-portion at a second connection portion.

Said second side face is connected to said first guiding portion at a third connection portion and is connected to said guiding-and-emitting-portion at a forth connection portion.

Said first side face makes a first angle smaller than 90° with respect to said extending direction at said first connection portion, An imaginary straight line passing said first connection portion and said second connection being makes angle α smaller than 90° with respect to said extending direction and said second side face makes a second angle which is not greater than 90° but greater than angle α with respect to said extending direction at said third connection portion.

It is noted that said first side face may be a convex face formed as to project toward a side far from said end face with respect to said imaginary straight line. Said first side face may be composed of a plurality of planar portions which make angles getting greater stepwise from said first connection portion toward second connection portion. Alternatively, said first side face may be a smoothly curved face.

Further, at least some of said second guiding portions may be arranged at intervals between second guiding portions adjacent to each other getting smaller stepwise away from said end face.

Said first guiding portion may have a slant side face at the opposite side to said guiding-and-emitting-portion, said slant side face being inclined as to get closer to said guiding-and-emitting-portion. Said first guiding portion may have an end portion at the opposite side to said end face which is arc-like-curved and connected to said guiding-and-emitting-portion.

In addition, some of said second guiding portions may be located within a predetermined range in the vicinity of said end face of said first guiding portion are distributed more densely as compared with second guiding portions located in an outer vicinage of said predetermined range.

The present invention is also applied to a surface light source device comprising a light guide plate and a primary light source. According to a feature of the present invention, said light guide plate is a light guide plate features as above and said primary light source is disposed opposite to said end face.

Further, the present invention is applied to a display comprising a surface light source device and a displaying member irradiated by an illumination light outputted said surface light source device. According to a feature of the present invention, said surface light source device is a surface light source device features as above.

According to the present invention, not only a first side face providing an inner-reflection face of a second guiding portion of a light guide plate is inclined as to get farther from an incidence face of the first guiding portion with approaching a guiding-and-emitting-portion but also a second side face is inclined as to get farther from an incidence face of the first guiding portion or extends vertical to an extending direction (vertical to incidence face).

Therefore disposing density of second guiding portions is heightened easier as compared with prior arts employing second guiding portions each of which has symmetric trapezoid-like planar shape.

As a result, an effective light guiding from the first guiding portion to guiding-and-emitting-portion via the second guiding portions is performed easily, leading an increased brightness on the emission face of the guiding-and-emitting-portion. Besides, brightness is uniformalized easily.

In addition, bright lines scarcely appear on the emission face in the vicinity of a connection portion between the guiding-and-emitting-portion and the second guiding portions, because the inner-reflection face of the second guiding portion deflect almost all of the light that comes from the first guiding portion to a direction generally vertical to a side face (interface] between the second guiding portion and the guiding-and-emitting-portion) of the guiding-and-emitting-portion. This uniformalizes emission brightness.

A surface light source device employing the light guide plate improved as above outputs an illumination light of even and high brightness. Accordingly, a display having a displaying member illuminated by the surface light source device can provide a bright and easily observable display image.

EMBODIMENT (Outlined Structure of Surface Light Source Device and Display)

Figure 1:
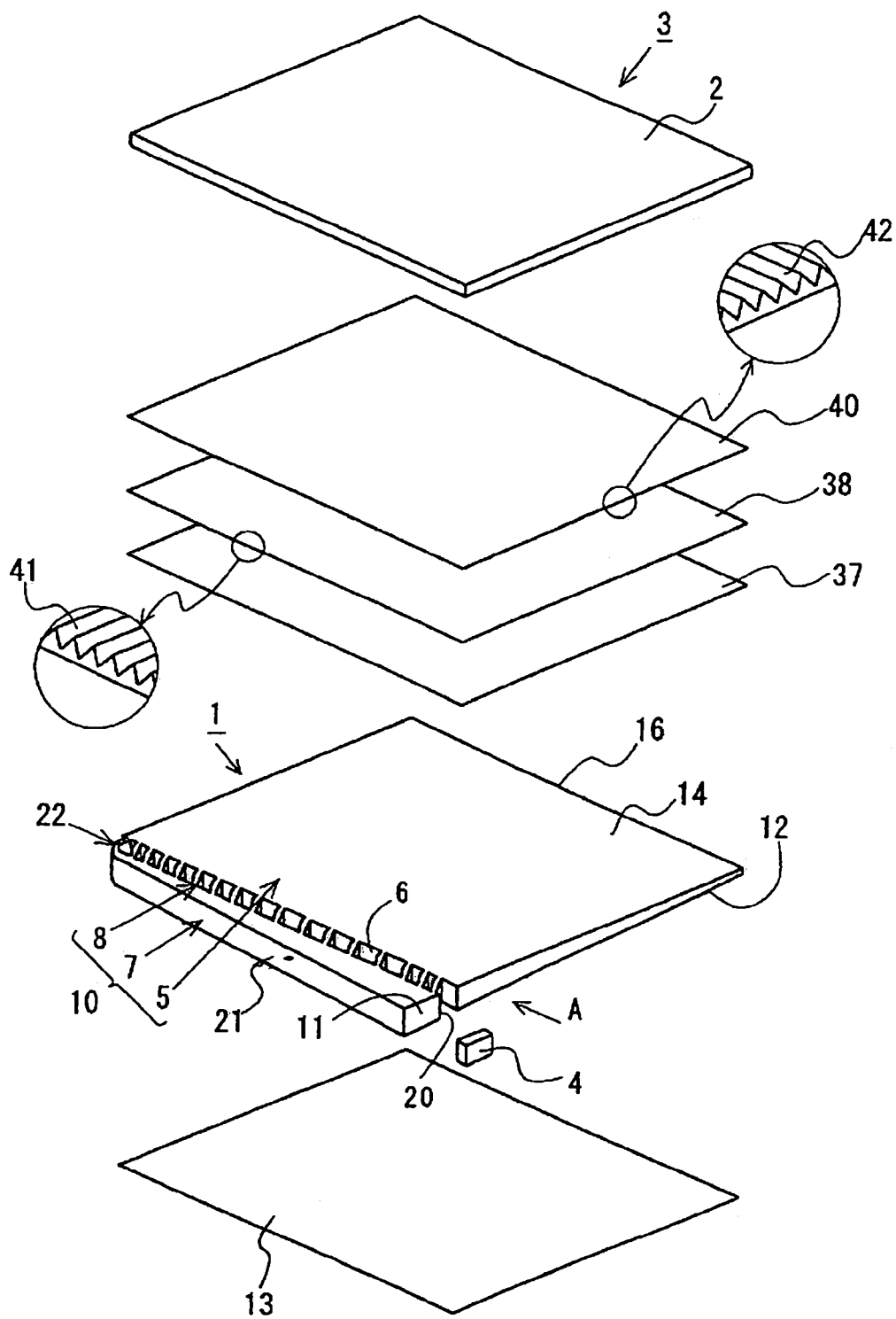
FIG. 1 is an exploded perspective view illustrating a surface light source device and display of an embodiment in accordance with the present invention.

Referring to FIG. 1, display (LCD) 3 is provided with surface light source device 1 and LCD panel (an example of displaying member) 3 illuminated by an illumination light outputted from surface light source device 1. Surface light source device 1 has light guide plate 10 and LED (primary light source) 4.

Light guide plate 10 is composed of three portions. A first portion is guiding-and-emitting-portion 5 having a planar shape like a rectangle. A second portion is first guiding portion 7 extending along side face 6 of guiding-and-emitting-portion 5. A third portion gives second guiding portions 8 bridging first guiding portion 7 to guiding-and-emitting-portion 5 at a plurality of positions along side face 6 of guiding-and-emitting-portion 5.

First guiding portion 7 is slender and extends in an extending direction vertical to which end face 11 is formed to provide an incidence face. LED 4 as a primary light source is disposed opposite to the incidence face. A major face of Light guide plate 10 provides emission face 14 and another major face provides back face 12. As required, reflection member 13 is disposed along back face 12.

Diffusing sheet 37 and two prism sheets 38 and 40 (examples of light control members) are disposed, optionally. LCD panel 3 is disposed on the outside of the light control members.

LED 4 consists of one chip formed of LED-chip in which LEDs of respective colors, R (red), G (green) and B (blue) of white LED. However, modifications are allowed. For example, white light may be formed by color-mixing out of LED package. Alternatively, light sources other than white light source or other than LED may be used.

(Light Guide Plate)

Figure 2:
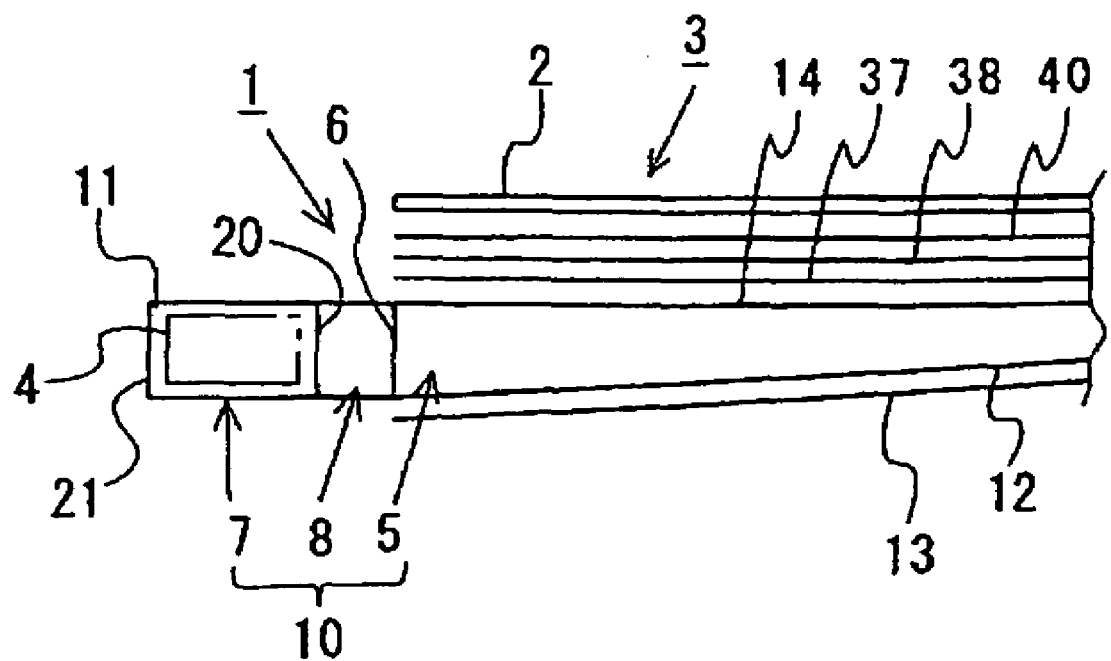
FIG. 2 is a side view of the surface light source device and display as viewed from direction A shown in FIG. 1.
Figure 3:
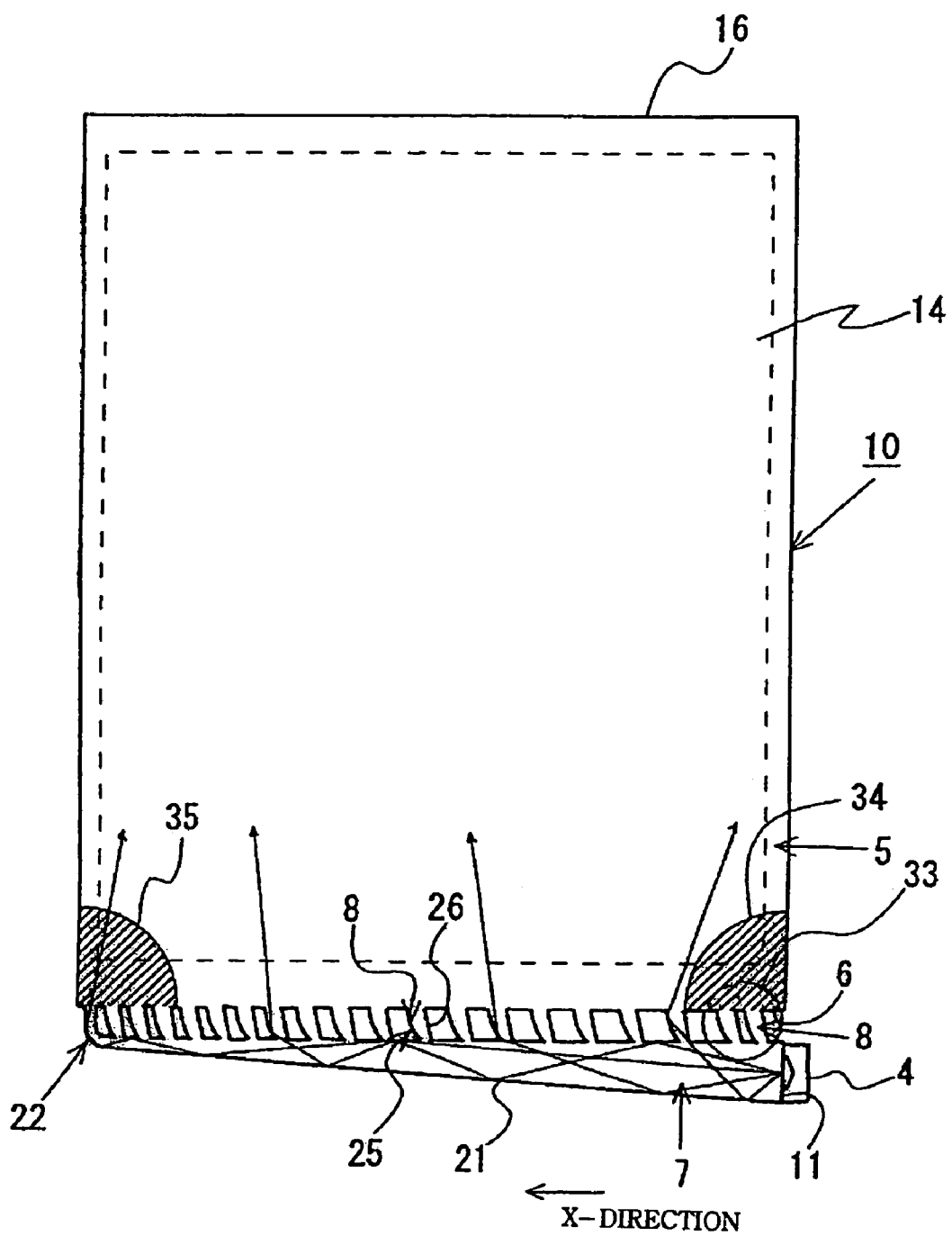
FIG. 3 is a plan view of a light guide plate employed in the embodiment in accordance with the present invention.

Referring to FIGS. 2 and 3, Light guide plate 10 is a plate-like member made of a light permeable resin material (such as PMMA (polymethyl methacrylate), polycarbonate (PC) or cycloolefin-type resin).

As mentioned above, Light guide plate 10 is composed of guiding-and-emitting-portion 5 having a planar shape like a rectangle, first guiding portion 7 extending along side face 6 of guiding-and-emitting-portion 5 and second guiding portions 8 bridging first guiding portion 7 to guiding-and-emitting-portion 5 at a plurality of positions along side face 6 of guiding-and-emitting-portion 5. These three portions 5, 8 and 8 form a one body.

Guiding-and-emitting-portion 5 preferably decreases gradually in thickness from side face 6 toward the opposite side face 16 as shown in FIGS. 1 and 2, giving a wedge-like cross section. Such a cross section shape promotes emission of inner propagation light from emission face 14. First guiding portion 7 may have a uniform thickness.

Emission promoting means such as unevenness pattern for promoting emission from emission face 14 is preferably applied to back face 12.

First guiding portion 7 extends along side face 6 of guiding-and-emitting-portion 5 as shown in FIGS. 1 to 3. Hereafter, this direction is called "X-direction (±X-direction)". A direction directed away from end face (incidence face) 11 vertically thereto is "+X-direction".

First guiding portion 7 is a thin-rod-like portion having a generally rectangular cross section along a plane perpendicular X-direction, thickness of which is approximately equal to that of guiding-and-emitting-portion 5 at side face 6. First guiding portion 7 has side face 20 providing a connecting portion (interface) with second guiding portion 8 and opposite side face 21. Side face 20 is formed generally in parallel with side face 6 of guiding-and-emitting-portion 5.

Side face 21 is inclined with respect to X-direction as to get closer to guiding-and-emitting-portion 5 away from end face 11. A planar shape as viewed from above emission face 14 is a wedge-like shape. This light of LED 4 introduced into first guiding portion 7 is avoided from being emitted from an end opposite to end face 11, entering into guiding-and-emitting-portion 5 easily.

Figure 5:
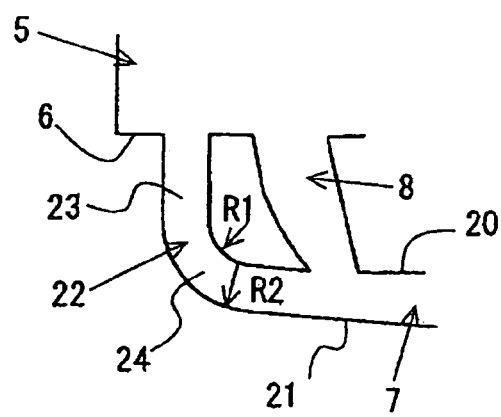
FIG. 5 is a partially enlarged plan view of a distal end part the farthest from an end face of a first guiding portion of the light guide plate shown in FIG. 3.

First guiding portion 7 is connected to an end side of second guiding portion 8 at the side of side face 20. As shown in FIGS. 1, 3 and 5, at the end opposite to end face 11 is formed distal guiding portion 22 which guides inner propagation light travelling through first guiding portion 7 toward guiding-and-emitting-portion 5.

Distal guiding portion 22 is provided with smoothly arc-curved arc-like portion 24 and a generally straight portion 23 connecting arc-like portion 24 to side face 6 of guiding-and-emitting-portion 5 to form one body.

Figure 4:
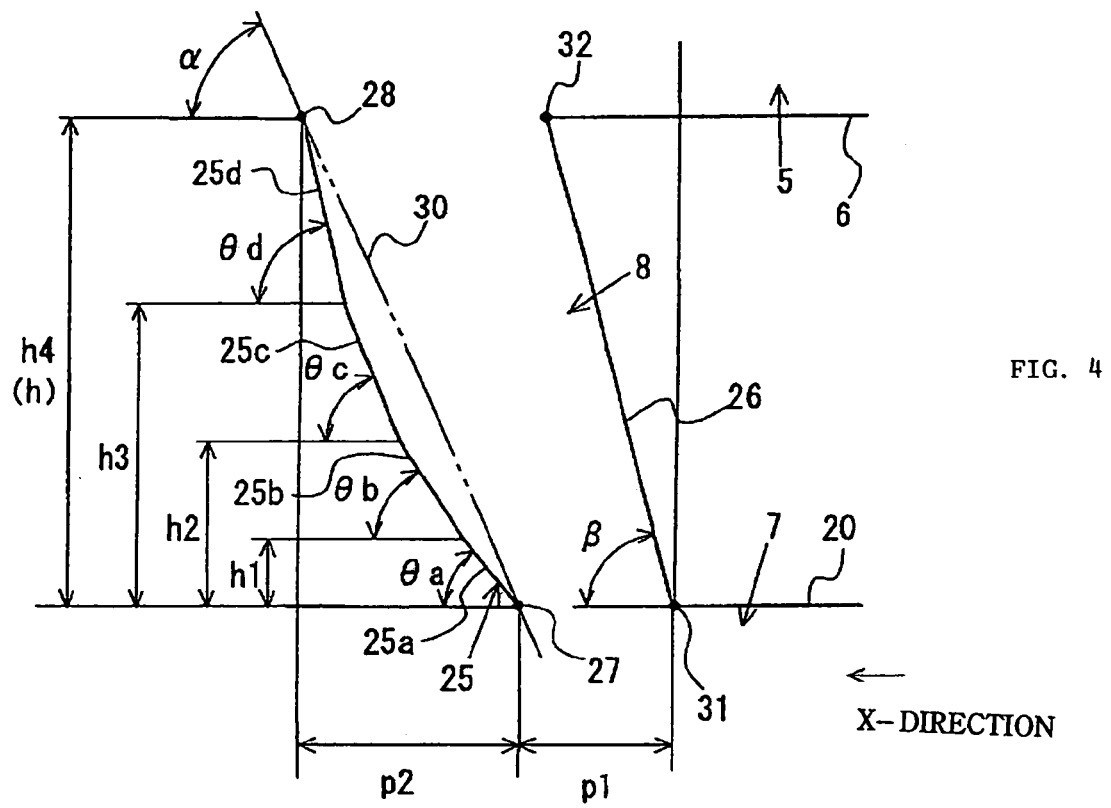
FIG. 4 is a partially enlarged plan view of a vicinage of a second guiding portion of the light guide plate shown in FIG. 3.

Each second guiding portion 8 is provided with inner-reflection face (first side face) 25 and opposite side face (second side face) 26 as shown in FIG. 4. It should be noted that first side face 25 is farther from incidence face 11 as compared with second side face 26.

Each inner-reflection face 25 is connected to first guiding portion 7 at an end (first connection portion) and connected to guiding-and-emitting-portion 5 at the other end (second connection portion).

Further, each inner-reflection face 25 is inclined at a sharp angle (smaller than 90°) with respect to +X-direction at the first connection portion. Thickness of second guiding portion 8 is approximately equal to that guiding-and-emitting-portion 5 at side face 6 and to that of first guiding portion 7 (See FIGS. 2, 3).

Inner-reflection face 25 is composed of four planar portions (first to fourth planar portions) from first planar portion 25a connected to first guiding portion 7 to fourth planar portion 25d connected to guiding-and-emitting-portion 5.

As shown in FIG. 4, inner-reflection face 25 make angles (θa to θd) getting greater from first planar portion 25a toward fourth planar portion 25d with respect to side face 20 of first guiding portion 7. It should be noted that all of planar portions 25a to 25d make sharp angles (smaller than 90°) with respect to +X-direction.

Inner-reflection face 25 includes first connection portion 27 connecting first planar portion 25a to first guiding portion 7 and second connection portion 28 connecting fourth planar portion 25d to guiding-and-emitting-portion 5, being convex projecting toward +X-direction with respect to a line (imaginary straight line) 30 passing both connection portions 27, 28.

Line 30 makes angle α with respect to +X-direction (parallel to side face 20 of first guiding portion 7). Angle α is smaller than 90°.

On the other hand, second side face 26 makes angle β not smaller than α and smaller than 90° with respect to +X-direction. Angle β is allowed to be equal to 90°.

Second side face 26 is connected to first guiding portion 7 at third connection portion 31 and connected to guiding-and-emitting-portion 5 at fourth connection portion 32.

Distance between first connection portion 27 and second connection portion 31 is smaller than that between second connection portion 28 and fourth connection portion 32.

In a certain range in the vicinity of end face 11 light guiding from first guiding portion 7 to second guiding portion 8 is apt to be somewhat difficult. To avoid this tendency, distance (disposing pitch) between second guiding portions 8, 8 is set small within the range and disposing density is set higher than that of at an outer vicinage of the range. An example of such range is shown by circle 33 in FIGS. 3 and 8. It is preferably that disposing pitch falls gradually away from the certain range. Such disposing density changes avoid light quantity that second guiding portions 8 receive from first guiding portion 7 from changing large depending on distance from end face 11.

Figure 6:
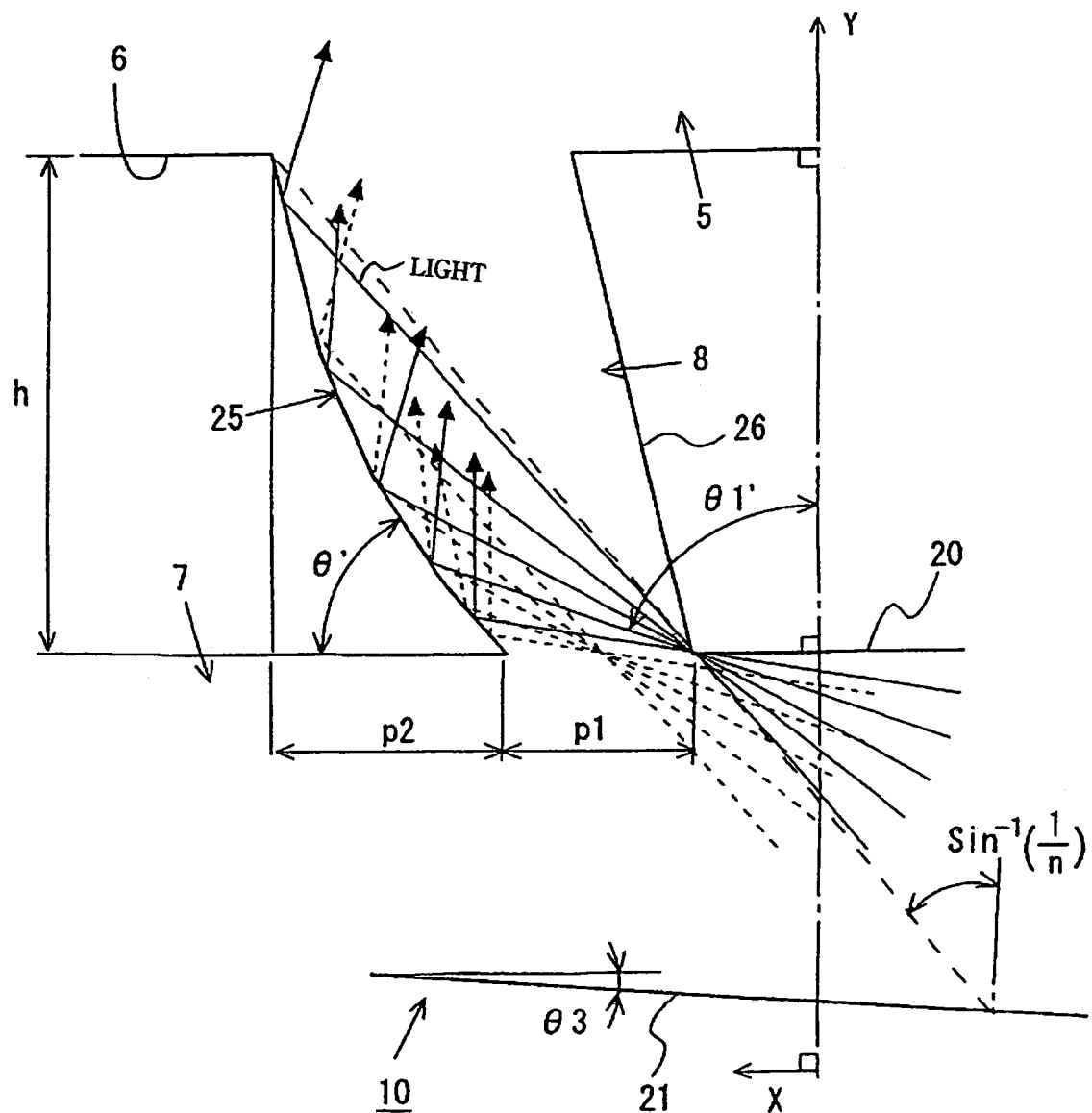
FIG. 6 is a diagram for illustrating shape design of second guiding portions, corresponding to FIG. 4.

FIG. 6 is a diagram for illustrating shape design of second guiding portion 8. It is preferable that second guiding portion 8 is ե ֆ ֆ-designed as to satisfy the following Formula 1 in order that light guide d from first guiding portion 7 to second guiding portion 8 is totally-reflected by inner-reflection face 25 of second guiding portion 8. Symbols in the following Formula 1 are defined as follows.

h=Distance between side face 20 of first guiding portion 7 and side face 6 of guiding-and-emitting-portion 5 p1=Width size along X-direction of second guiding portion 8 at a connection portion with first guiding portion 7 p2=X-direction size of inner-reflection face 25

θ3=Angle made bay side face 21 of first guiding portion 7 with respect to +X-direction n=Refractive index of Light guide plate 10

$$\tan^{-1}\left[\frac{h}{p1+p2}\right] > 90° - \sin^{-1}\left[\frac{1}{n}\right] + \theta 3 \qquad \text{(Formula 1)}$$

In addition, first to fourth planar portions 25a to 25d of inner-reflection face 25 is formed as to have inclination angle θ' satisfying the following Formula 2. In Formula 2, inclination angles θ' and θ1' are defined as follows.

θ'=Angle made by inner-reflection face 25 with respect to +X-direction (side face 20 of first guiding portion 7)

θ1'=Angle made by light travelling from first guiding portion 7 to second guiding portion 8 with respect to +Y-direction vertical to X-direction (normal direction of side face 20 of first guiding portion 7)

n=Refractive index of Light guide plate 10

$$\theta' < 180° - \theta 1' - \sin^{-1}\left[\frac{1}{n}\right] \qquad \text{(Formula 2)}$$

Figure 7:
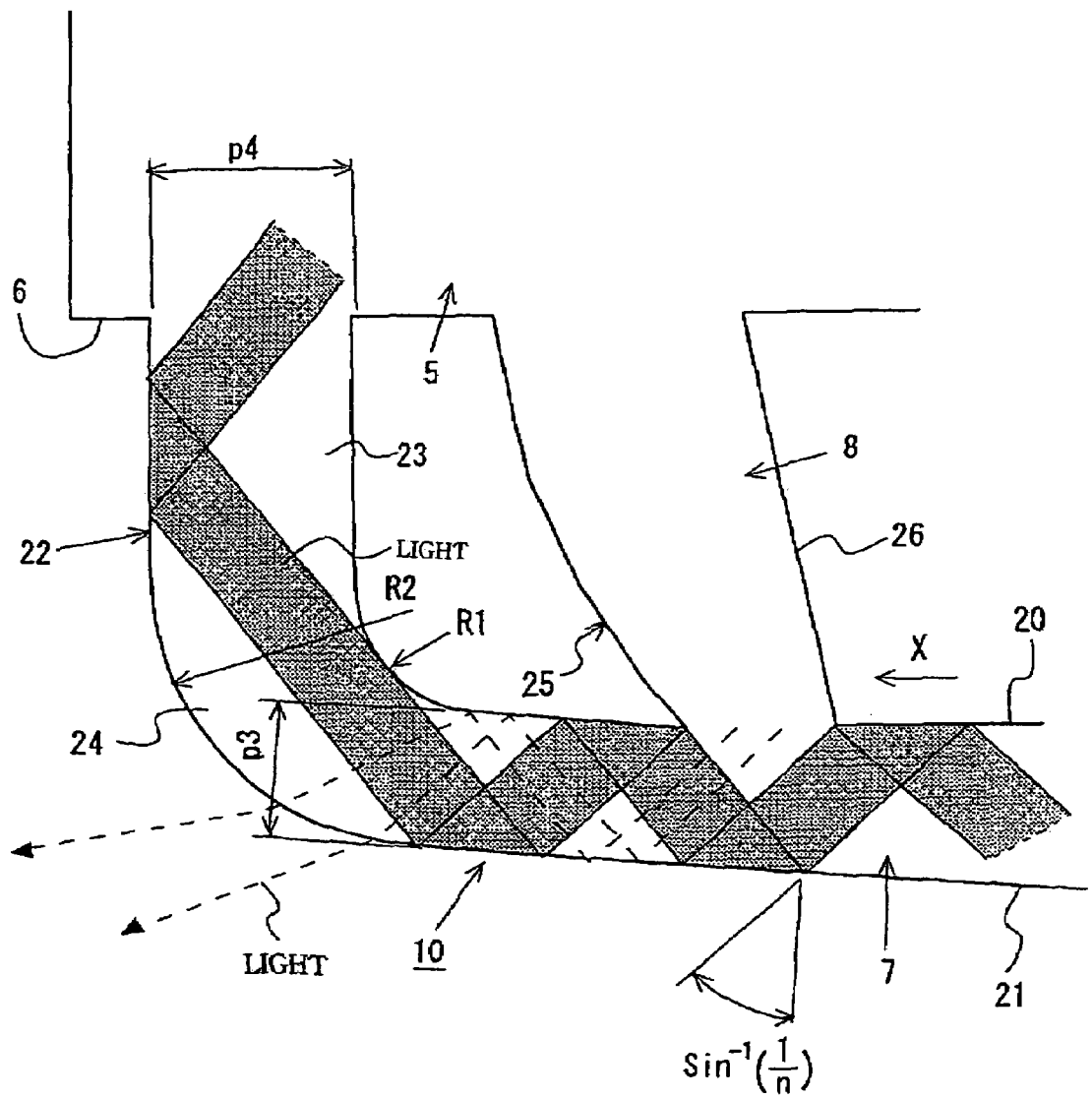
FIG. 7 is a diagram for illustrating shape design of a distal guiding portion the farthest from the end face of the first guiding portion, corresponding to FIG. 5.

FIG. 7 is a diagram for illustrating shape design of distal guiding portion 22 the farthest from end face 11 of first guiding portion 7. As shown in FIG. 7, distal guiding portion 22 functions as to cause light, which has failed to be guided by second guiding portion 8 locate the farthest from end face 11 of first guiding portion 7, to be guided toward guiding-and-emitting-portion 5.

Distal guiding portion 22 includes arc-like portion 24. Arc-like portion 24 has an inner surface with radius R1 and an outer surface formed radius R2. Arc-like portion 24 connects smoothly an end portion of first guiding portion 7 having width size p3 to generally straight portion 23 having width size p4 of distal guiding portion 22 (p4(>p3).

This causes light, which is guided up to the end portion of first guiding portion 7, to be guided to guiding-and-emitting-portion 5. Leaking of light as shown by doted line is avoided, being not caused by light which reaches the end portion and incident thereto at an angle almost equal to the critical angle.

It is noted that distal guiding portion 22 may be connected to guiding-and-emitting-portion 5 only by arc-like portion 24 alternatively, with generally straight portion 23 being omitted.

Figure 8:
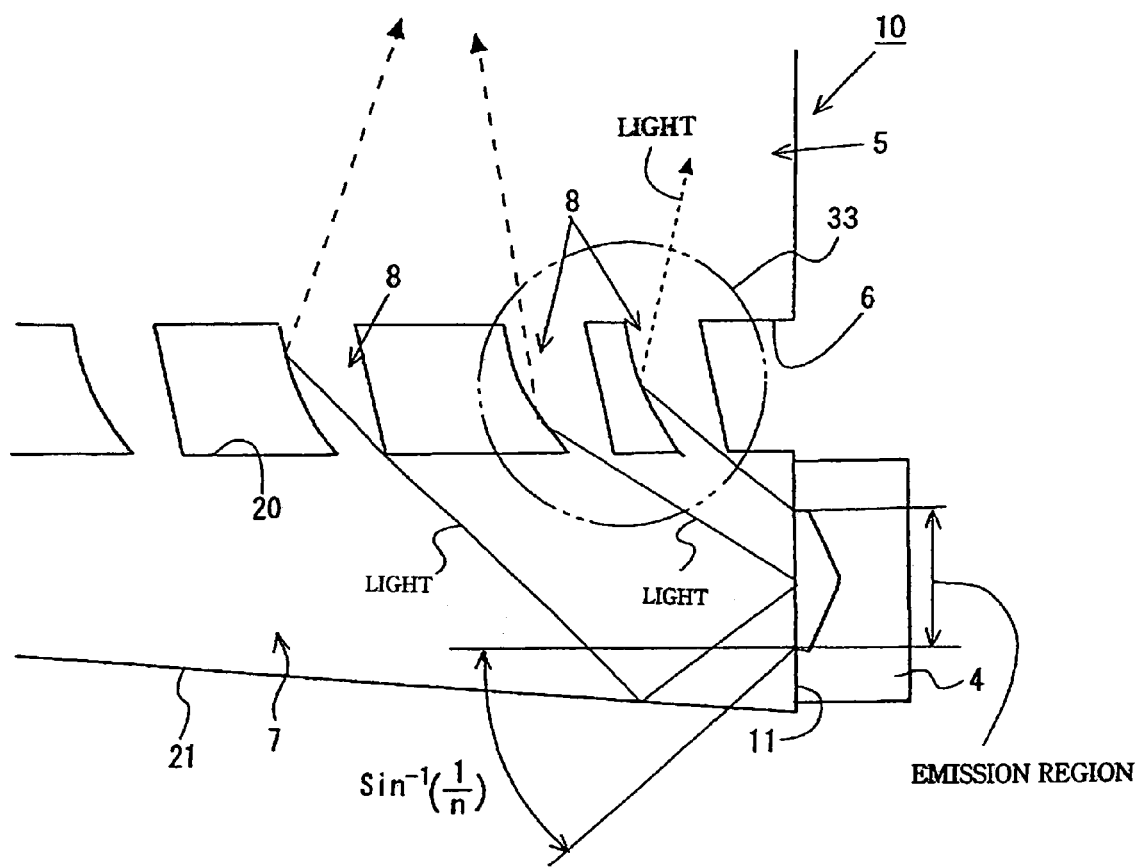
FIG. 8 is a diagram for illustrating changing of disposing density of second guiding portions in the vicinity of the end face of the first guiding portion, giving a partially enlarged plan view of the light guide plate.

FIG. 8 is a diagram for illustrating changing of disposing density of second guiding portion 8 in the vicinity of end face 11. As shown in FIG. 8, there arises a range (simply called "LED-4-vicinage") 33 in which light reflected by side face of first guiding portion 7 fail to reach side face 20, because LED 4 emits light in a limited angular range.

Although LED-4-vicinage 33 is a region which light emitted from LED 4 hardly reach, some light travels toward side face 20 without being reflected by side face 21.

Therefore, if disposing density of second guiding portions 8 is increased in LED-4-vicinage 33, light is easily guided to corner portion 34 (hatched part in FIG. 3) of guiding-and-emitting-portion 5 at which dark area would be apt to appear. As a result, brightness reduction at corner portion 34 of guiding-and-emitting-portion can be prevented.

Figure 9A:
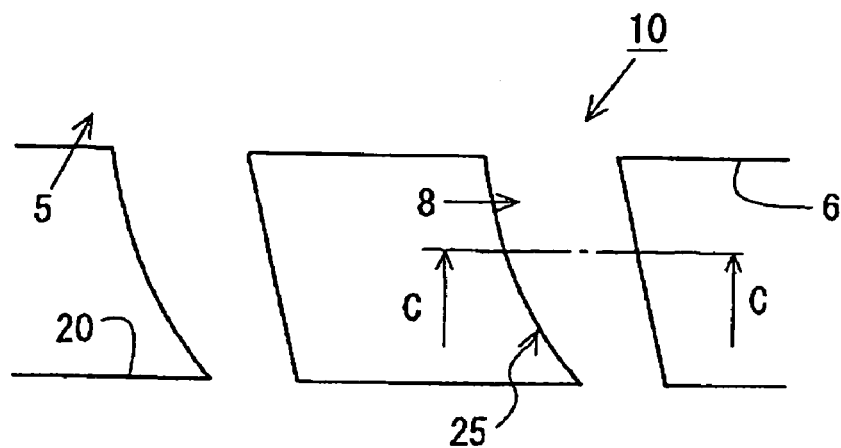
FIGS. 9A and 9B are diagrams for illustrating a cross sectional shape of a second guiding portion, FIG. 9A giving a plan view of the second guiding portion and FIG. 9B giving a cross section view along C-C in FIG. 9A.
Figure 9B:
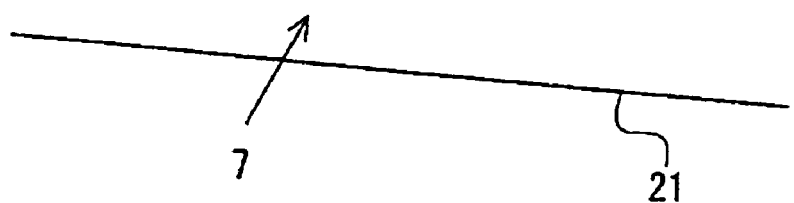
Figure 9B:
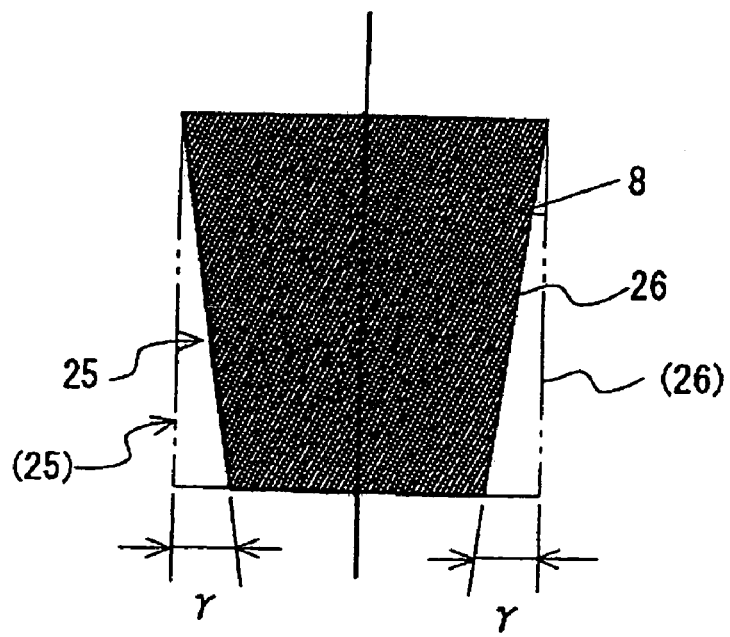

It is noted that second guiding portions 8 are formed as to have generally rectangular cross sections along side face 6 (X-direction), as shown in FIGS. 9A, 9B, which may have relaxing gradient γ made between inner-reflection face 25 and face 26 for the sake of making manufacturing easy or a step difference between them.

Figure 18:
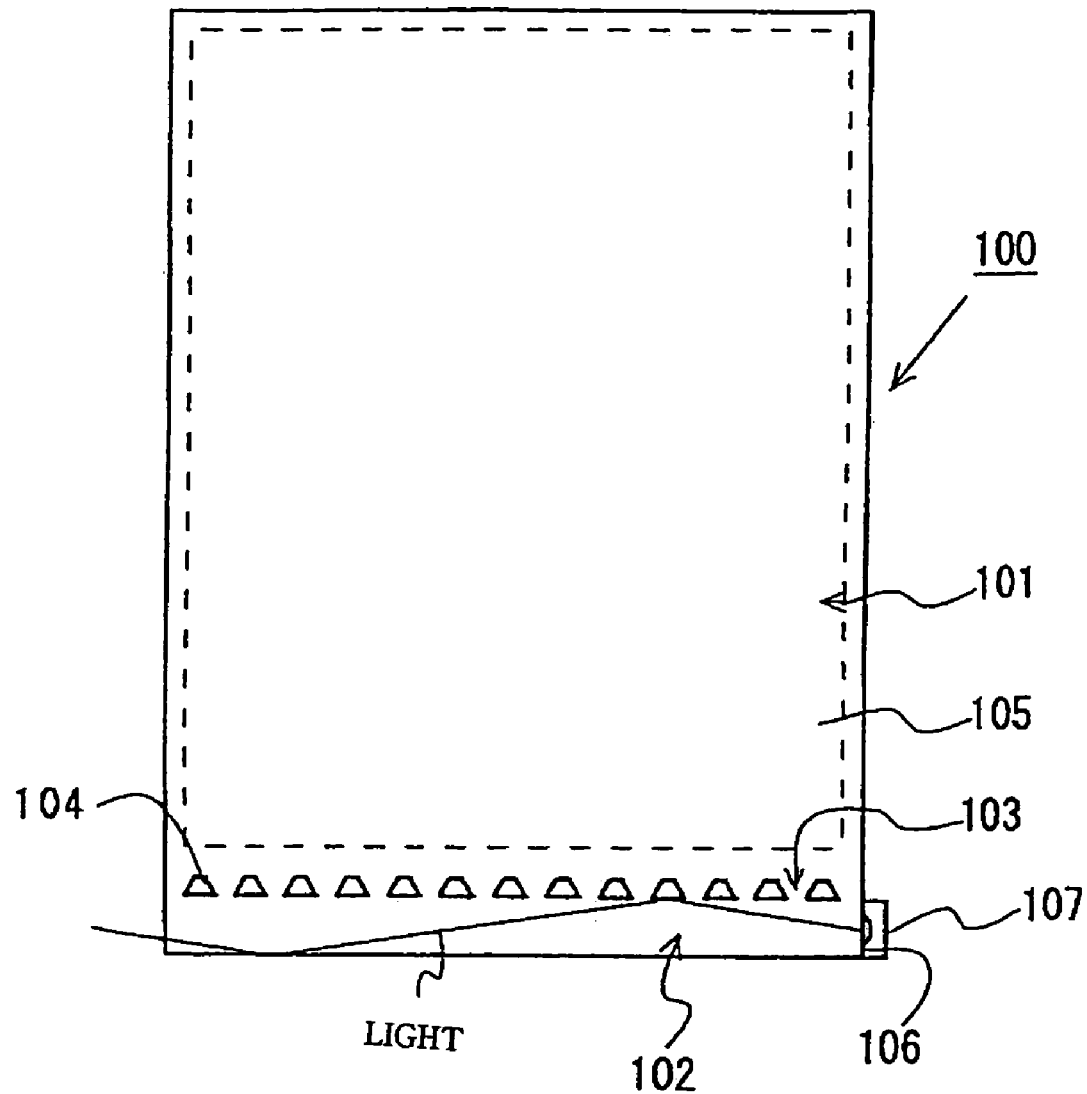

According to light guide plate 10 structured above, since inner-reflection face 25 makes a sharp angle with respect to +X-direction and face 26 makes a sharp angle or the right angle with respect to +X-direction, disposing density of second guiding portions 8 can be heightened as compared with prior arts employing second guiding portions each of which has symmetric trapezoid-like planar shape (second guiding portions 103 of Light guide plate 100 shown in FIG. 18).

As a result, an effective light guiding in first guiding portion 7 to guiding-and-emitting-portion 5 by the use of second guiding portions 8 is performed easily.

In addition, utilization efficiency of light emitted from LED 4 is heightened because distal guiding portion 22 causes light, which is guided up to the end portion of first guiding portion 7, to be guided up to guiding-and-emitting-portion 5 without being leaked to the outside of first guiding portion 7.

In addition, light can be guided to corner portion 35 on the side face side of guiding-and-emitting-portion 5 at which dark area would be apt to appear, resulting in preventing corner portion 35 on the side face side from showing a dark area. This uniformalizes emission brightness.

Further, since disposing density of second guiding portions 8 is increased in LED-4-vicinage 33 as compared with that in other region, light from LED 6 is effectively guided to corner portion 34 of guiding-and-emitting-portion 5 at which dark area would be apt to appear, leading to a high utilization efficiency of light from LED 6.

Figure 16:
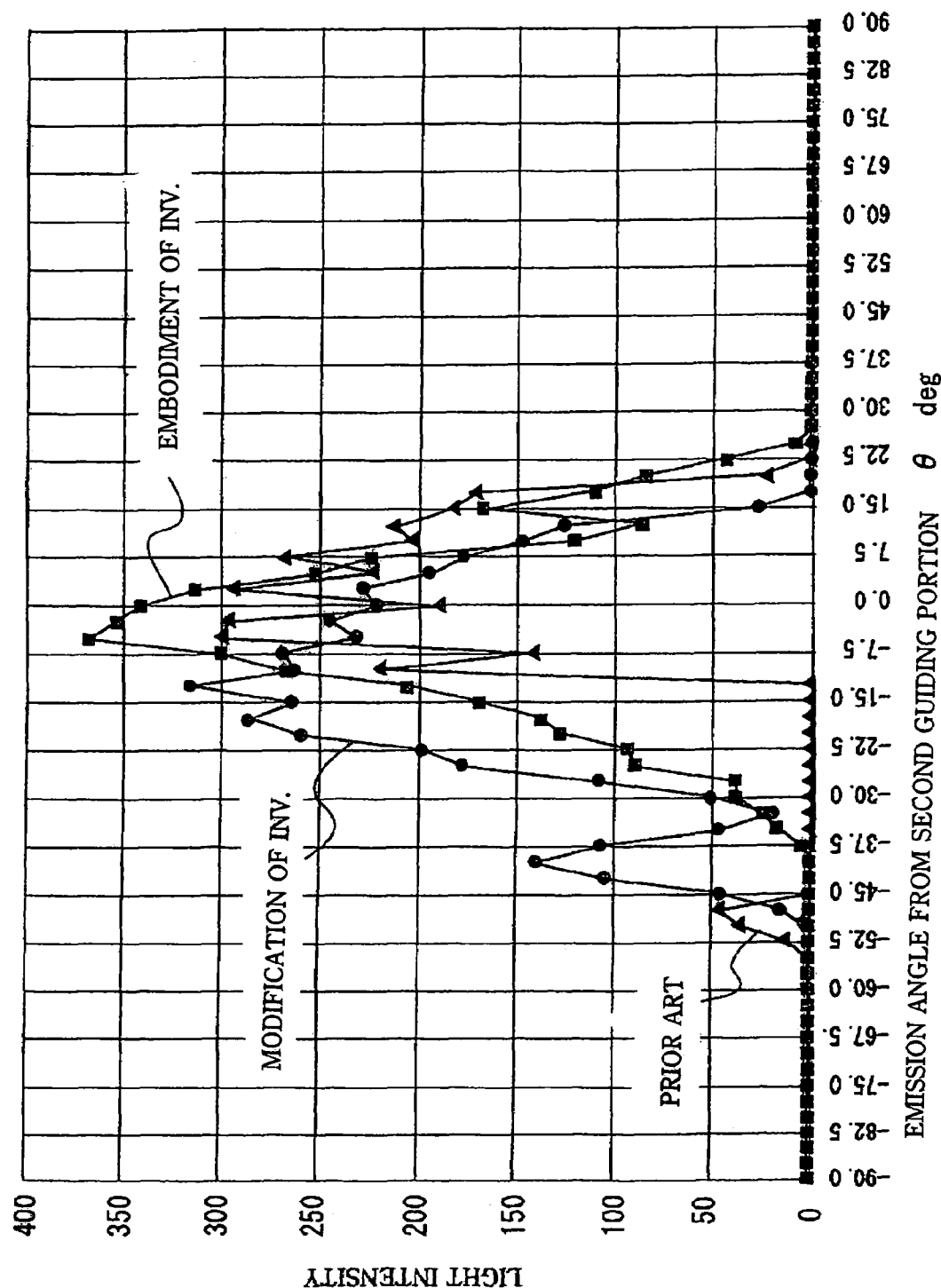
FIG. 16 is a graph illustrating a relation between emission angle of light emitted from a second guiding portion to the plate-like member side and light intensity.

FIG. 16 is a graph for comparing characteristics of light guide plate 10 of this embodiment with those of conventional light guide plate 100 (FIG. 18), plotting intensity (quantity) of light guided from first guiding portion 7 (101) to second guiding portion 8 (103) in relation to emission angle θ.

It is noted that negative emission angle −θ corresponds to an angular range inclined anticlockwise with respect to a normal direction of side face 6 (104) as viewed from above emission face 14, and positive emission angle +θ corresponds to angular range inclined clockwise with respect to the normal direction of side face 6 (104) as viewed from above emission face 14, Emission angle θ equal to 0 corresponds to the normal direction vertical to side face 6 (104) of guiding-and-emitting-portion 5. Bracketed numerals 101, 103 are used for conventional Light guide plate 100.

As shown in FIG. 16, Light guide plate 10 of the embodiment causes light to be guided as to be gathered around a direction vertical to side face 6 of guiding-and-emitting-portion 5.

As described above, Light guide plate 10 of the embodiment can causes light of LED 4 to be guided effectively to guiding-and-emitting-portion 5 via first guiding portion 7, second guiding portions 8 and distal guiding portion 22 and besides to be guided effectively to both side corner portions 34. 35 of guiding-and-emitting-portion 5 at which dark area would be apt to appear.

Therefore emission brightness is increased and uniformalized as compared with prior arts.

(Light Control Member)

Diffusing sheet 37 and two prism sheets 38 and 40 are examples of light control members), structure functions of which are known well. These are sheet-like members made of a light permeable resin (such as PC, PMMA, PET or UV-setting resin), being disposed along emission face 14. They have planar shapes and sizes generally the same as those of emission face 14.

Both two prism sheets 38, 40 have upper faces provided with a plurality of prismatic projections 41, 42 having generally triangular cross sections. Prismatic projections 41 of lower side prism sheet 38 has a running direction generally vertical to a running direction of prismatic projections 42 of upper side prism sheet 40.

Light emitted from emission face 14 is gathered around a normal direction of emission face 14 by two prism sheets 38, 40 after being diffused by diffusion sheet 37, providing a heightened brightness for the normal direction.

(Reflection Member)

Reflection member 13 is also a well-known optical member, being made of a resin material such as PET. Reflectivity is given by, for example, by applying evaporation-depositing of reflective metal layer such as Al. Planar shape and size are generally the same as those of back face 12 of guiding-and-emitting-portion 5. Reflection member 13 returns light leaked from back face 12 into guiding-and-emitting-portion 5 by reflection.

It is noted that reflection member 13 may be omitted. If casing accommodating Light guide plate 10 has an inner face functioning as a reflective face the case may be used as a reflection member.

(Modification of Surface Light Source Device and Display)

Surface light source device 1 and LCD 3 shown in FIG. 1 do not limit the present invention. For example, the following modifications are allowed.

Figure 10:
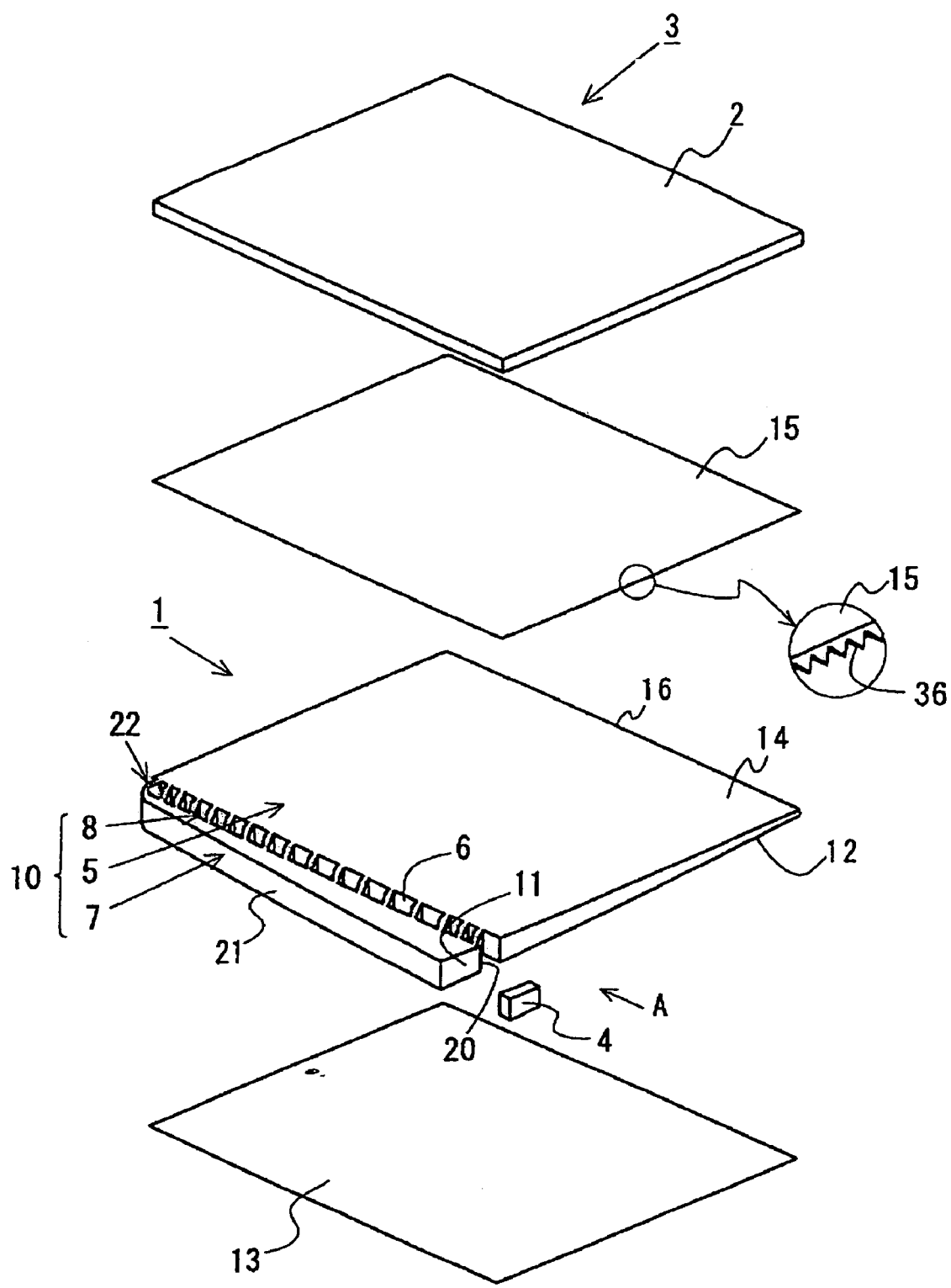
FIG. 10 is an exploded perspective view illustrating modified surface light source device and display in accordance with the present invention.
Figure 11:
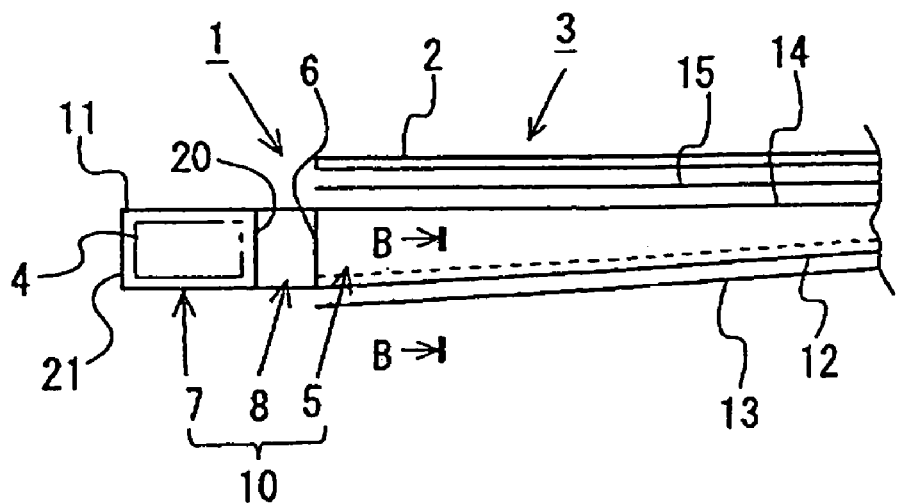
FIG. 11 is a side view of the surface light source device and display as viewed from direction A shown in FIG. 10.
Figure 12:
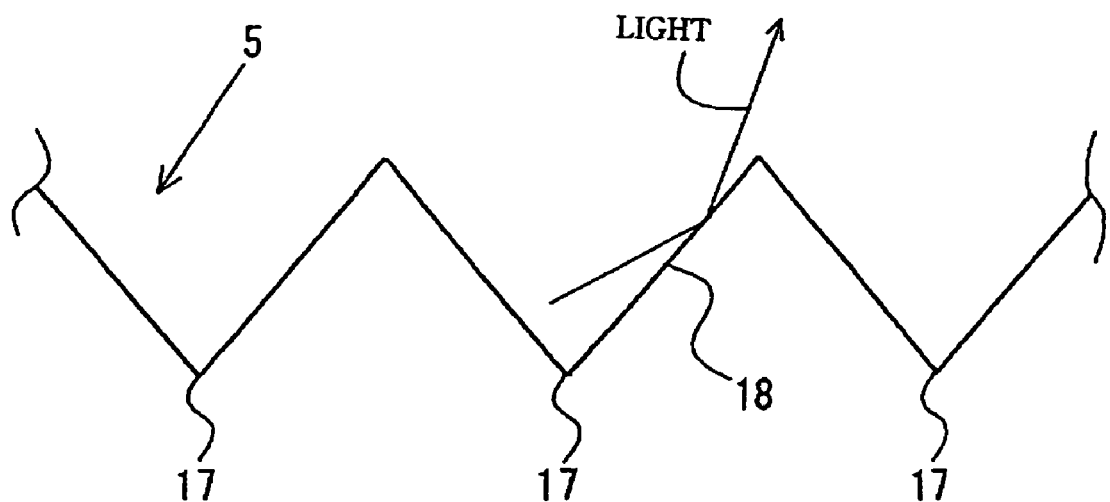
FIG. 12 is a partially enlarged cross section view along B-B shown in FIG. 11.

(1) As shown in FIGS. 10 to 12, guiding-and-emitting-portion 5 of Light guide plate 10 may have back face 12 provided with a plurality of prismatic projections 17 having generally triangular cross sections running vertically with respect to side face 6.

Slopes 18 of prismatic projections 17 cause light travelling within guiding-and-emitting-portion 5 to be deflected to a normal direction of emission face 14 by inner-reflection in an imaginary plane which is parallel to X-direction and vertical to emission face 14.

(2) Three light control members shown in FIG. 1 may be replaced by light control member (prism sheet) 15 having a lower face opposite to Light guide plate 10 provided with a plurality of prismatic projections 36 having generally triangular cross sections and running vertically with respect to prismatic projections 17 as shown in FIG. 10.

This causes light, which is emitted from emission face 14, to be deflected to the normal direction, under limiting diffusion and maintaining directivity, in an imaginary plane which is vertical to X-direction and vertical to emission face 14. As a result, emission brightness for the normal direction is still more improved.

(3) Modifications of Light Guide Plate

Figure 13:
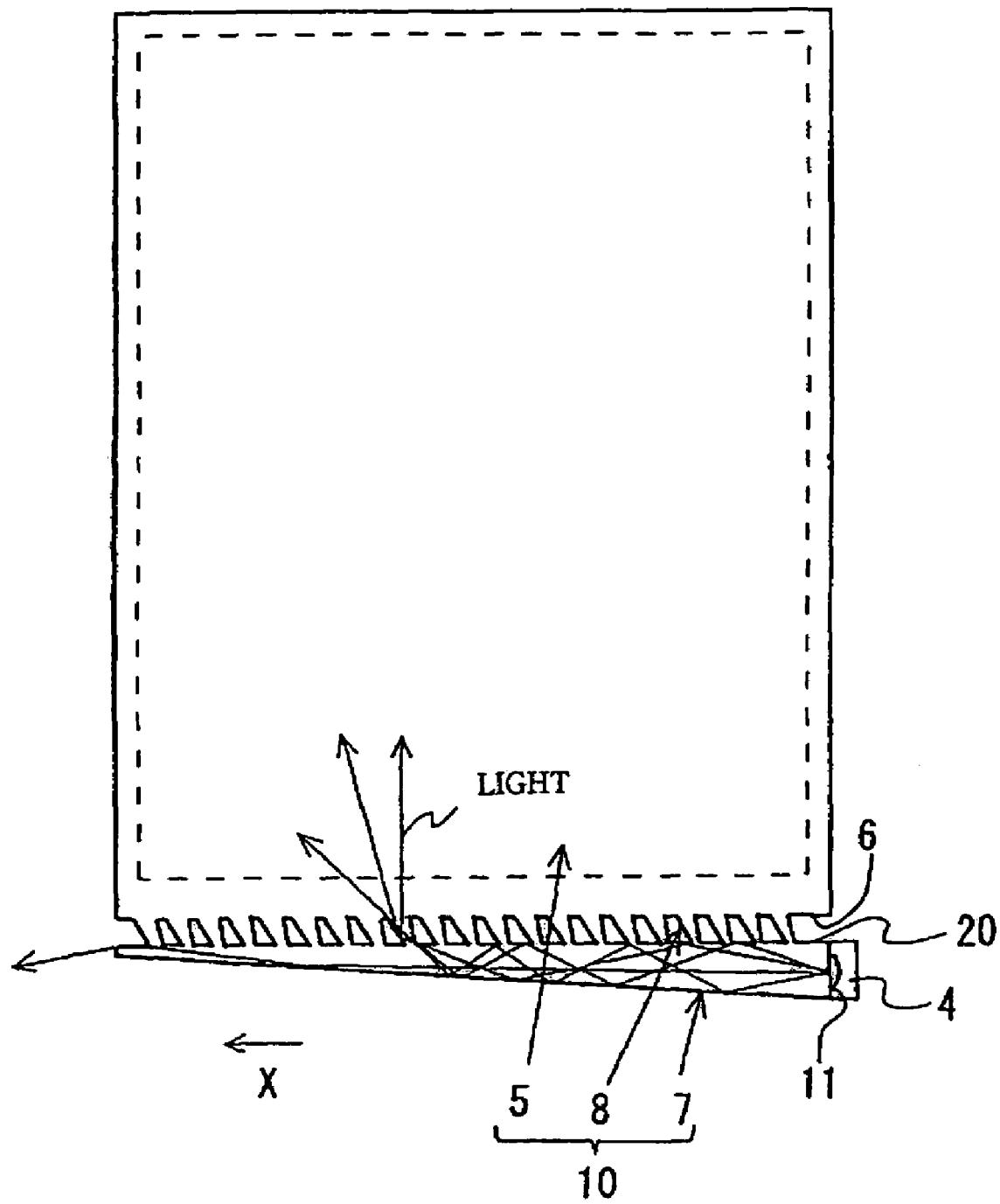
FIG. 13 is a plan view of a modified light guide plate in accordance with the present invention.
Figure 14:
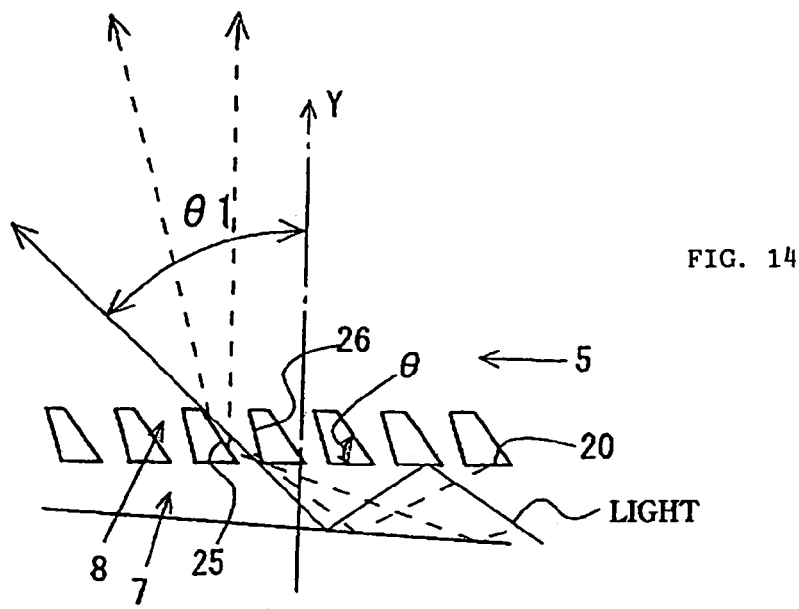
FIG. 14 is a partially enlarged view of the light guide plate shown in FIG. 13.

FIGS. 13 and 14 show modifications of light guide plate. These illustrated Light guide plates 10 inner-reflection faces 25 formed of straight planar surfaces. Further, no distal guiding portion is formed at the end portion opposite to end face 11 of first guiding portion 7. In addition, second guiding portions 8 are arranged at a constant pitch.

Figure 17:
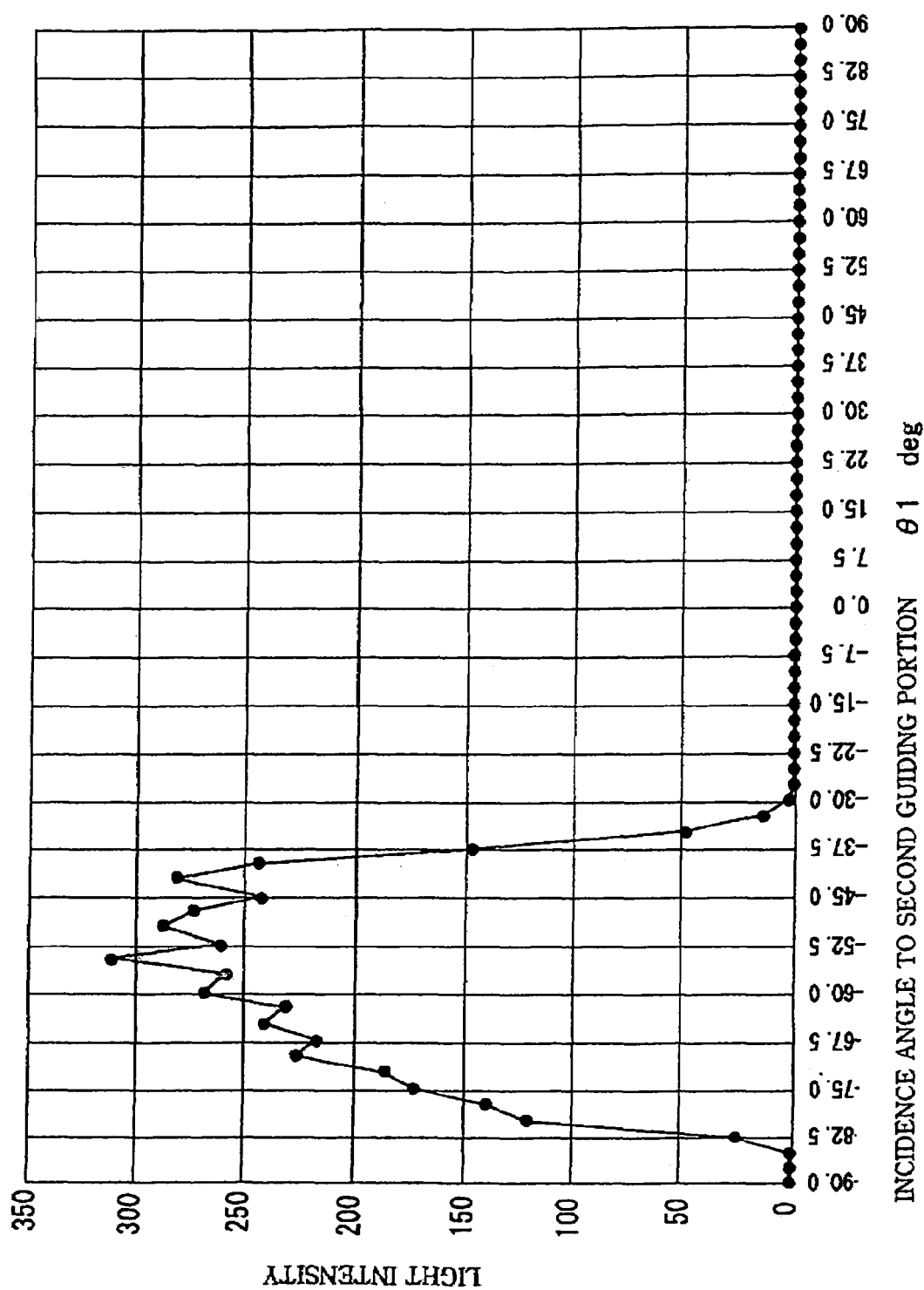
FIG. 17 is a graph illustrating a relation between incidence angle of light travelling from a first guiding portion to a second guiding portion of a modified light guide plate in accordance with the present invention and light intensity; and, FIG. 18 is a plan view of a light guide plate in accordance with the present invention.

Inner-reflection faces 25 of such modified light guide plates 10 make sharp angle (θ) with respect to +X-direction. This inclination angle θ is determined under consideration of incidence angle θ1 of light incident from first guiding portion 7 to second guiding portion 8 (See FIG. 17).

Now, incidence angle θ1 of light incident from first guiding portion 7 to second guiding portion 8 is defined as angle with respect to direction Y (normal direction of side face 20) vertical to side face 20.

This angle becomes − (minus) corresponds to an angular range inclined anticlockwise with respect to a normal direction of side face 20 and becomes + (plus) corresponds to angular range inclined clockwise with respect to the normal direction of side face 20.

Incidence angle θ1 to be considered is set at about 55° giving the maximum light quantity.

It is noted that inner-reflection face (first side face) 25 and opposite face (second side face) 26 are formed in generally the same way as compared with face 26 of second guiding portion 8 shown in FIG. 4.

Light guide plate 10 of this modification also enables second guiding portions 8 are disposed at higher disposing density as compared with conventional Light guide plate 100 shown in FIG. 18.

Therefore, as shown in FIG. 16, more quantity of light is guided from second guiding portions 8 to guiding-and-emitting-portion 5 as compared with the prior art shown in FIG. 18. This results in a heightened brightness of (1) illumination light emitted from emission face 14 as compared with the prior art.

Light guide plate 10 of this modification has two peaks generally at 0° and at −40° of emission angle (entering angle) θ from second guiding portion 8 to guiding-and-emitting-portion 5, as shown in FIG. 16.

Further, on entering of light having these two peaks from second guiding portion 8 to guiding-and-emitting-portion 5, light corresponding −40° peak can give a factor causing a vicinage of side face 6 on emission face 14 to be apt to have an inserted bright lines.

This phenomenon tends to be conspicuous when back face 12 of guiding-and-emitting-portion 5 is provided with prismatic projections 17 having generally triangular cross sections as shown in FIG. 12 and prism sheet 15 as shown in FIG. 10 is disposed along emission face 14, according to mechanism as below.

Figure 15A:
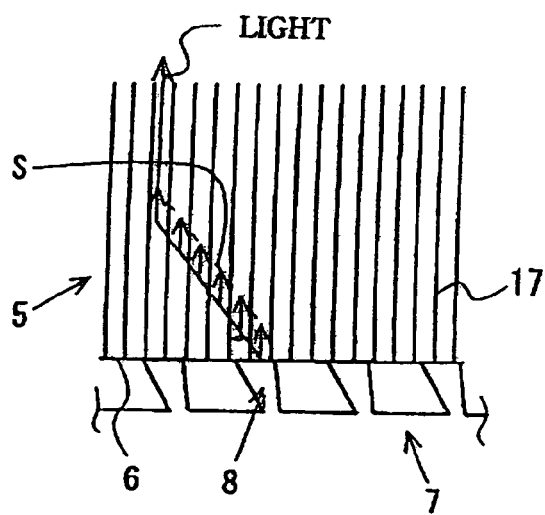
FIGS. 15A and 15B are diagrams for illustrating generation mechanism of inserted bright lines, FIG. 15A giving a diagramed plan view of a light guide plate and FIG. 15B giving a diagramed cross sectional side view of a surface light source device employing the light guide plate shown in FIG. 15A (cross section view along a direction vertical the a side face of a guiding-and-emitting-portion)
Figure 15B:
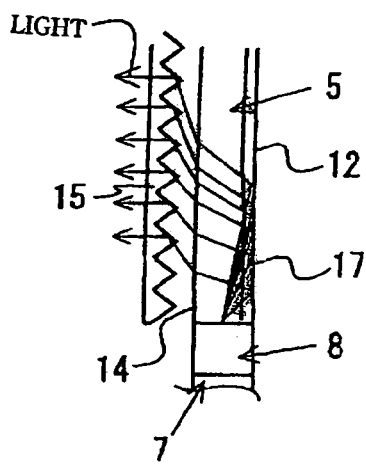

As shown in FIG. 15, when light of about −40° enters into guiding-and-emitting-portion 5, the light is deflected to around a direction vertical to side face 6 by prismatic projections 17 formed on back face 12 of and then deflected to around the normal direction of emission face 14 by prism sheet 15.

This brings inserted bright line S (line-like strikingly bright as compared with the other part) which appears, on emission face 14, in the vicinity of side face 16 corresponding to locations of second guiding portions 8.

If this inserted bright line S is generally weak enough to be allowed, it can be used as it is. If any problem of illumination quality arises, it can be solved by excluding an occurring region of inserted bright line S from effective light emitting area (such as area used for LCD image displaying). Inserted bright line S is blurred if a diffusing sheet or the like is disposed along emission face 14.

If inner-reflection face 25 is configured as shown in FIG. 6, inner-reflection face 25 reflect almost all of the light coming from first guiding portion 7 as to produce light having a directivity corresponding to directions approximately vertical to side face 6 of guiding-and-emitting-portion 5. This provides not only a highly bright illumination light but also suppression of inserted bright line.

(4) Light guide plates 10 employed in surface light source devices shown in FIGS. 1 and 10, or Light guide plate 10 shown in FIG. 13 may be provided emission promotion means on back face 12 and/or emission face 14.

Emission-promotion means may be, for example, rough surface (such as satin pattern), hemisphere-like, pyramid-like or cone-like projections or recesses, prismatic projections or the like.

(5) Light guide plate 10 may have scattering ability inside. Scattering ability is given, for example, by dispersing scattering elements within light guide plate 10.

(6) Another Modification of Light Guide Plate

Inner-reflection face 25 of second guiding portion 8 may be composed five or more planar portions, or formed of smoothly curved face.

Finally, for the sake of easy understanding of the present invention, shown below are examples of sizes and inclination angles of second guiding portions 8 of light guide plate 10, with FIG. 4 being referred.

p1=0.51 mm
p2=0.66 mm
h1=0.2 mm
h2=0.5 mm
h3=0.9 mm
h4=1.5 mm
$\theta a$=50°
$\theta b$=57.5°
$\theta c$=67.5°
$\theta d$=77.5
$\alpha$=66.3°
$\beta$=77.5°

What is claimed is:

1. A light guide plate comprising:
   a slender first guiding portion which has an end face providing an incidence face and extends along an extending direction vertical to said end face;
   a guiding-and-emitting-portion having a generally rectangular major face providing an emission face;
   a plurality of second guiding portions which bridge said first guiding portion to said guiding-and-emitting-portion at a plurality of positions along said extending direction,
   each of said second guiding portion having a first side face providing an inner-reflection face and a second side face nearer to said end face as compared with the first side face;
   said first side face being connected to said first guiding portion at a first connection portion and being connected to said guiding-and-emitting-portion at a second connection portion;
   said second side face being connected to said first guiding portion at a third connection portion and being connected to said guiding-and-emitting-portion at a forth connection portion;
   said first side face making a first angle smaller than 90° with respect to said extending direction at said first connection portion;
   an imaginary straight line passing said first connection portion and said second connection being making angle $\alpha$ smaller than 90° with respect to said extending direction; and
   said second side face making a second angle which is not greater than 90° but greater than angle $\alpha$ with respect to said extending direction at said third connection portion.

2. A light guide plate in accordance with claim 1, wherein said first side face is a convex face formed as to project toward a side far from said end face with respect to said imaginary straight line.

3. A light guide plate in accordance with claim 2, wherein said first side face is composed of a plurality of planar portions which make angles getting greater stepwise from said first connection portion toward second connection portion.

4. A light guide plate in accordance with claim 2, wherein said first side face is a smoothly curved face.

5. A light guide plate in accordance with any of claims 1 through 4, wherein at least some of said second guiding portions are arranged at intervals between second guiding portions adjacent to each other getting smaller stepwise away from said end face.

6. A light guide plate in accordance with any of claims 1 through 4, wherein said first guiding portion has a slant side face at the opposite side to said guiding-and-emitting-portion, said slant side face being inclined as to get closer to said guiding-and-emitting-portion.

7. A light guide plate in accordance with claim 5, wherein said first guiding portion has a slant side face at the opposite side to said guiding-and-emitting-portion, said slant side face being inclined as to get closer to said guiding-and-emitting-portion.

8. A light guide plate in accordance with claim 6, wherein said first guiding portion has an end portion at the opposite side to said end face which is arc-like-curved and connected to said guiding-and-emitting-portion.

9. A light guide plate in accordance with claim 7, wherein said first guiding portion has an end portion at the opposite side to said end face which is arc-like-curved and connected to said guiding-and-emitting-portion.

10. A light guide plate in accordance with any of claims 1 through 4, wherein some of said second guiding portions are located within a predetermined range in the vicinity of said end face of said first guiding portion are distributed more densely as compared with second guiding portions located in an outer vicinage of said predetermined range.

11. A light guide plate in accordance with claim 5, wherein some of said second guiding portions are located within a predetermined range in the vicinity of said end face of said first guiding portion are distributed more densely as compared with second guiding portions located in an outer vicinage of said predetermined range.

12. A light guide plate in accordance with claim 6, wherein some of said second guiding portions are located within a predetermined range in the vicinity of said end face of said first guiding portion are distributed more densely as compared with second guiding portions located in an outer vicinage of said predetermined range.

13. A light guide plate in accordance with claim 7, wherein some of said second guiding portions are located within a predetermined range in the vicinity of said end face of said first guiding portion are distributed more densely as compared with second guiding portions located in an outer vicinage of said predetermined range.

14. A light guide plate in accordance with claim 8, wherein some of said second guiding portions are located within a predetermined range in the vicinity of said end face of said first guiding portion are distributed more densely as compared with second guiding portions located in an outer vicinage of said predetermined range.

15. A light guide plate in accordance with claim 9, wherein some of said second guiding portions are located within a predetermined range in the vicinity of said end face of said first guiding portion are distributed more densely as compared with second guiding portions located in an outer vicinage of said predetermined range.

16. A surface light source device comprising:
a light guide plate; and
a primary light source,
wherein said light guide plate is according to any of claims 1 through 4 and said primary light source is disposed opposite to said end face.

17. A surface light source device comprising:
a light guide plate; and
a primary light source,
wherein said light guide plate is according to claim 5 and said primary light source is disposed opposite to said end face.

18. A surface light source device comprising:
a light guide plate; and
a primary light source,
wherein said light guide plate is according to claim 6 and said primary light source is disposed opposite to said end face.

19. A surface light source device comprising:
a light guide plate; and
a primary light source,
wherein said light guide plate is according to claim 7 and said primary light source is disposed opposite to said end face.

20. A surface light source device comprising:
a light guide plate; and
a primary light source,
wherein said light guide plate is according to claim 8 and said primary light source is disposed opposite to said end face.

21. A surface light source device comprising:
a light guide plate; and
a primary light source,
wherein said light guide plate is according to claim 9 and said primary light source is disposed opposite to said end face.

22. A surface light source device comprising:
a light guide plate; and
a primary light source,
wherein said light guide plate is according to claim 10 and said primary light source is disposed opposite to said end face.

23. A surface light source device comprising:
a light guide plate; and
a primary light source,
wherein said light guide plate is according to claim 11 and said primary light source is disposed opposite to said end face.

24. A surface light source device comprising:
a light guide plate; and
a primary light source,
wherein said light guide plate is according to claim 12 and said primary light source is disposed opposite to said end face.

25. A surface light source device comprising:
a light guide plate; and
a primary light source,
wherein said light guide plate is according to claim 13 and said primary light source is disposed opposite to said end face.

26. A surface light source device comprising:
a light guide plate; and
a primary light source,
wherein said light guide plate is according to claim 14 and said primary light source is disposed opposite to said end face.

27. A surface light source device comprising:
a light guide plate; and
a primary light source,
wherein said light guide plate is according to claim 15 and said primary light source is disposed opposite to said end face.

28. A display comprising:
a surface light source device; and
a displaying member irradiated by an illumination light outputted said surface light source device,
wherein said surface light source device is according to claim 16.

29. A display comprising:
a surface light source device; and
a displaying member irradiated by an illumination light outputted said surface light source device,
wherein said surface light source device is according to claim 17.

30. A display comprising:
a surface light source device; and
a displaying member irradiated by an illumination light outputted said surface light source device,
wherein said surface light source device is according to claim 18.

31. A display comprising:
a surface light source device; and
a displaying member irradiated by an illumination light outputted said surface light source device,
wherein said surface light source device is according to claim 19.

32. A display comprising:
a surface light source device; and
a displaying member irradiated by an illumination light outputted said surface light source device,
wherein said surface light source device is according to claim 20.

33. A display comprising:
a surface light source device; and
a displaying member irradiated by an illumination light outputted said surface light source device,
wherein said surface light source device is according to claim 21.

34. A display comprising:
a surface light source device; and
a displaying member irradiated by an illumination light outputted said surface light source device,
wherein said surface light source device is according to claim 22.

35. A display comprising:
a surface light source device; and
a displaying member irradiated by an illumination light outputted said surface light source device,
wherein said surface light source device is according to claim 23.

36. A display comprising:
a surface light source device; and
a displaying member irradiated by an illumination light outputted said surface light source device,
wherein said surface light source device is according to claim 24.

37. A display comprising:
a surface light source device; and
a displaying member irradiated by an illumination light outputted said surface light source device, wherein said surface light source device is according to claim 25.

38. A display comprising:
a surface light source device; and
a displaying member irradiated by an illumination light outputted said surface light source device,
wherein said surface light source device is according to claim 26.

39. A display comprising:
a surface light source device; and
a displaying member irradiated by an illumination light outputted said surface light source device,
wherein said surface light source device is according to claim 27.

* * * * *